US008711890B2

(12) United States Patent
Diab et al.

(10) Patent No.: US 8,711,890 B2
(45) Date of Patent: Apr. 29, 2014

(54) METHOD AND SYSTEM FOR MODULARIZED CONFIGURABLE CONNECTOR SYSTEM FOR ETHERNET APPLICATIONS

(75) Inventors: Wael William Diab, San Francisco, CA (US); Michael D. Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 297 days.

(21) Appl. No.: 12/840,683

(22) Filed: Jul. 21, 2010

(65) Prior Publication Data

US 2012/0014384 A1 Jan. 19, 2012

Related U.S. Application Data

(60) Provisional application No. 61/365,211, filed on Jul. 16, 2010.

(51) Int. Cl.
*H04L 12/28* (2006.01)

(52) U.S. Cl.
USPC .......................................... 370/546; 370/389

(58) Field of Classification Search
USPC .................................. 370/389, 546
See application file for complete search history.

(56) References Cited

U.S. PATENT DOCUMENTS

| 5,382,182 | A * | 1/1995 | Shen et al. | 439/676 |
| 5,704,802 | A * | 1/1998 | Loudermilk | 439/490 |
| 7,207,846 | B2 * | 4/2007 | Caveney et al. | 439/676 |
| 2005/0245127 | A1 * | 11/2005 | Nordin et al. | 439/540.1 |
| 2006/0053335 | A1 * | 3/2006 | Hille | 714/4 |
| 2008/0222312 | A1 * | 9/2008 | Simanonis | 710/10 |
| 2009/0041004 | A1 * | 2/2009 | Emmanuel | 370/352 |

FOREIGN PATENT DOCUMENTS

WO   WO 2008042415 A1 * 4/2008 ............... H01Q 1/22

OTHER PUBLICATIONS

Nexans "LANmark 7 GG45 snap in connector (cat 7) screened" May 1, 2007.*
Nexans "Cabling Challenges for 10GBase-T" Oct. 4, 2004.*
Nexans "Category 7 definition" Dec. 31, 2002.*

* cited by examiner

*Primary Examiner* — Dang Ton
*Assistant Examiner* — Robert M Morlan
(74) *Attorney, Agent, or Firm* — Brinks Gilson & Lione

(57) ABSTRACT

A first modular Ethernet connector and a coupled corresponding second modular Ethernet connector may communicate data based on Ethernet standards. The Ethernet connectors may be configurable and comprise at least twelve contact positions. Different connector configurations may support widely different data rates. The Ethernet connectors may fit within a handheld device and/or may be sized to fit greater than twenty-four connectors in a 1 RU faceplate of a 19 inch rack. A variable number of conductor and/or ground contact positions may be unpopulated or populated with contacts of various materials. The Ethernet connectors may be configured with a properly fitting latching mechanism, with connector shielding and/or to ground cable shielding. The Ethernet connectors may be sized and fitted for secure coupling. The Ethernet connectors may be coupled to a twisted pair cable. Differential pair conductors are terminated adjacently. The Ethernet connectors may comprise POE, a PHY and/or an antenna.

20 Claims, 4 Drawing Sheets

METHOD AND SYSTEM FOR MODULARIZED CONFIGURABLE CONNECTOR SYSTEM FOR ETHERNET APPLICATIONS

CROSS-REFERENCE TO RELATED APPLICATIONS/INCORPORATION BY REFERENCE

This application makes reference to, claims priority to, and claims the benefit of U.S. Provisional Application Ser. No. 61/365,211, filed on Jul. 16, 2010, which is incorporated herein by reference in its entirety.

This application also makes reference to:
U.S. patent application Ser. No. 12/701,381, which was filed on Feb. 5, 2010;
U.S. patent application Ser. No. 12/752,065, which was filed on Mar. 31, 2010;
U.S. patent application Ser. No. 12/785,102, which was filed on May 21, 2010;
U.S. patent application Ser. No. 12/702,173, which was filed on Feb. 8, 2010; and
U.S. patent application Ser. No. 61/365,189 which was filed on Jul. 16, 2010.

Each of the above stated applications is hereby incorporated herein by reference in its entirety.

FIELD OF THE INVENTION

Certain embodiments of the invention relate to communication systems. More specifically, certain embodiments of the invention relate to a modularized configurable connector system for Ethernet applications.

BACKGROUND OF THE INVENTION

Communication devices may incorporate a plurality of features, for example, a mobile phone, a digital camera, an Internet browser, a gaming device, a Bluetooth headphone interface and/or a location device. In this regard, the communication devices may be operable to communicate via a plurality of wire-line and/or wireless networks such as local area networks, wide area networks, wireless local area networks, cellular networks and wireless personal area networks, for example. In this regard, endpoint devices may communicate via various wireless and/or wire-line switches, routers, hubs, access points and/or base stations.

Many communication devices may communicate via twisted pair cables which may comprise pairs of copper wire that are twisted together. Various numbers of twists or turns in the wire pairs may enable mitigation of common mode electromagnetic interference. Twisted pair cabling may be shielded and/or unshielded. Shielding may comprise a conductive material that may enable grounding of the cable. The shielding may enclose a single pair of twisted wires and/or may enclose a plurality of pairs. The shielding may comprise foil and/or a braided sheath, for example. In this regard, the shielding may mitigate cross talk between twisted pairs and/or between a plurality of cables. Various properties of a cable, for example, wire gauge, safety information, category, verification of testing, inner shielding, outer shielding, no shielding, type of use, such as patch cord, and/or country of manufacture may be imprinted on the cable jacket during manufacture.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for modularized configurable connector system for Ethernet applications.

Various advantages, aspects and novel features of the present invention, as well as details of an illustrated embodiment thereof, will be more fully understood from the following description and drawings.

DETAILED DESCRIPTION OF THE INVENTION

Figure 1:
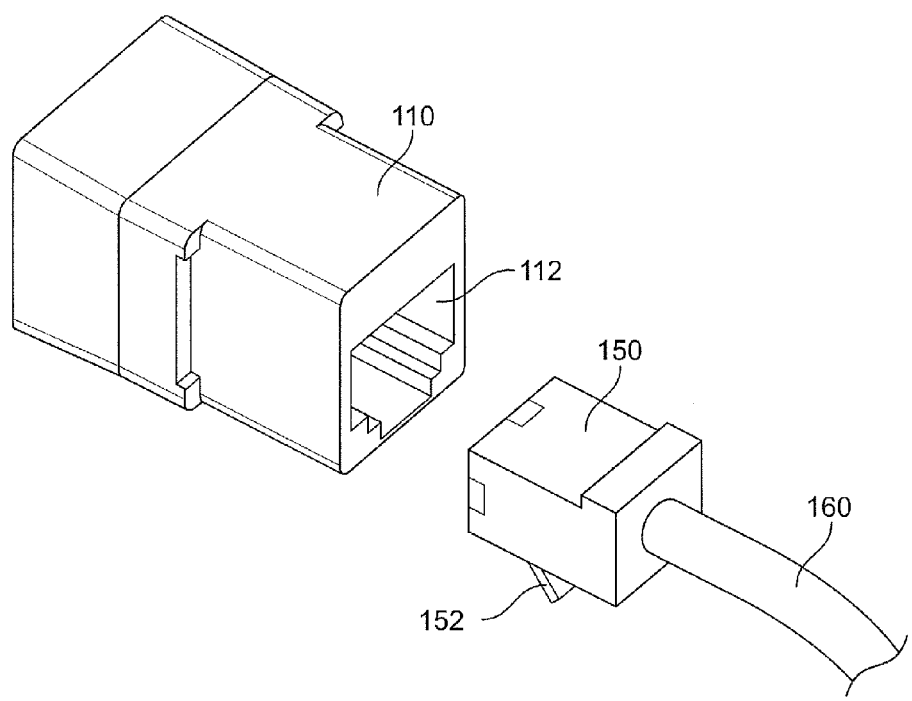
FIG. 1 is a block diagram illustrating an exemplary pair of corresponding configurable Ethernet connectors, in accordance with an embodiment of the invention.

Certain embodiments of the invention can be found in a method and system for a modularized configurable connector system for Ethernet applications. In accordance with various embodiments of the invention, a first modular Ethernet connector and/or a corresponding second modular Ethernet connector may be operable to communicate data in accordance with Ethernet standards. The first modular Ethernet connector may communicate data with the corresponding second modular Ethernet connector that is communicatively coupled to the first modular Ethernet connector. The first modular Ethernet connector and/or the corresponding second modular Ethernet connector may be configurable into one or more of a plurality of configurations to enable communication of data at data rates that are less than, equal to and/or greater than 10 Gigabits per second. The first modular Ethernet connector and/or the corresponding second modular Ethernet connector may comprise at least 12 electrical conductor contact positions. The first modular Ethernet connector and the corresponding second modular Ethernet connector may be sized to fit within a handheld device. The first modular Ethernet connector and the corresponding second modular Ethernet connector may be sized so as to fit 24 or more of the first modular Ethernet connector and/or 24 or more of the corresponding second modular Ethernet connector in a single standard size 1 rack unit faceplate of a 19 inch rack. The first modular Ethernet connector and the corresponding second modular Ethernet connector may be configurable to have a variable number of populated electrical conductor contacts, a variable number of unpopulated electrical conductor contact positions and/or a variable number of electrical ground conductor contacts. One or both of the first modular Ethernet connector and the corresponding second modular Ethernet connector are, one or both of shielded and configurable to ground shielding. The first modular Ethernet connector and the corresponding second modular Ethernet connector may be configurable to populate one or more of the electrical conductor contact positions with various types of conducting materials. The first modular Ethernet connector and/or the corresponding second modular Ethernet connector may be configured with a latching mechanism to mechanically secure proper coupling of the first modular Ethernet connector to the corresponding second modular Ethernet connector. The first modular Ethernet connector and/or the corresponding second modular Ethernet connector may be sized and fitted together such that friction between the first modular Ethernet connector and the corresponding second modular Ethernet connector is utilized to mechanically secure coupling of the first modular Ethernet connector and the corresponding second modular Ethernet connector. The first modular Ethernet connector and/or the corresponding second modular Ethernet connector may be coupled to a twisted pair cable. Conductors of a differential pair of conductors may be terminated in adjacent electrical conductor contact positions in the first modular Ethernet connector and the corresponding second modular Ethernet connector. The first modular Ethernet connector and/or the corresponding second modular Ethernet connector may comprise one or more integrated physical layer devices. The first modular Ethernet connector and/or the corresponding second modular Ethernet connector may comprise one or more integrated wireless communication antennas. The first modular Ethernet connector and/or the second corresponding modular Ethernet connector may be configured to enable communication of power utilizing Power Over Ethernet (POE). The first modular Ethernet connector may be referred to as an Ethernet connector and the corresponding second modular Ethernet connector may be referred to as a corresponding Ethernet connector or an Ethernet connector, for example.

FIG. 1 is a block diagram illustrating an exemplary pair of corresponding configurable Ethernet connectors, in accordance with an embodiment of the invention. Referring to FIG. 1, there is shown an Ethernet connector 110 and a keyed receptacle area 112. In addition, there is shown a corresponding Ethernet connector 150, a latching mechanism 152 and a twisted pair cable 160.

The Ethernet connector 110 and the Ethernet connector 150 may comprise a pair of corresponding Ethernet connectors. The Ethernet connector 110 and the Ethernet connector 150 may be operable to be coupled and may support Ethernet communication. One or both of the Ethernet connectors 110 and 150 may comprise a modular housing that may be operable to be stacked, ganged and/or installed in an efficient and/or uniform manner. Materials utilized for housing of the Ethernet connectors 110 and/or 150 may vary. For example, the housing may be made of non-conducting and/or conducting materials such as plastic and/or metal. The Ethernet connectors 110 and/or 150 may be shielded or unshielded.

In an exemplary embodiment of the invention, the Ethernet connector 110 may be a receptacle connector that may comprise a modular housing and the Ethernet connector 150 may be a corresponding Ethernet connector which may be referred to as a plug. The Ethernet connector 110 may comprise a keyed receptacle area 112 and the Ethernet connector 150 may comprise a complimentary exterior contour that may enable mating of the connectors in a proper orientation such that the connectors are not misaligned and/or damaged. The dimension of the keyed receptacle area 112 and the complimentary exterior contour of the Ethernet connector 150 may be sized and fitted together such that friction between the Ethernet connector 110 and the corresponding Ethernet connector 150 may be utilized to mechanically secure coupling and prevent unwanted disconnection of the connectors and/or contacts within the connectors. The invention is not limited to any specific shape of the keyed receptacle area 112 and/or of the corresponding exterior contour of the Ethernet connector 150 and any suitable shapes may be utilized. Moreover, one or both of the Ethernet connector 110 and the Ethernet connector 150 may be configured to comprise a latching mechanism that may mechanically secure coupling of the Ethernet connector 110 and the corresponding Ethernet connector 150. For example, a latching mechanism may be located on the exterior of the Ethernet connector 150 and/or may be located within the interior of the keyed receptacle area 112 of the Ethernet connector 110. An exemplary latching mechanism 152 is shown on the exterior of the Ethernet connector 150. Notwithstanding, the invention is not limited to any specific type of latching mechanism and/or to any specific position of the latching mechanism and any suitable mechanism may be utilized.

The Ethernet connector 110 may be configured to be coupled to a circuit board in a communication device, to be installed in a patch panel or a wall mount and/or to be coupled to a cable, for example. Similarly, the Ethernet connector 150 may be configured to be coupled to a circuit board in a communication device, to be installed in a patch panel or a wall mount and/or to be coupled to a cable, for example. The Ethernet connector 110 and/or the Ethernet connector 150 may comprise dimensions that are smaller than an RJ45 connector. For example, the Ethernet connector 110 and/or the Ethernet connector 150 may be small enough to be installed in a handheld device, such as a mobile phone or smart phone for use in network communication. In another exemplary embodiment of the invention, the Ethernet connector 110 and/or the Ethernet connector 150 may be small enough such that greater than 24 connectors or connector modules may be installed in a 1 rack unit (RU) patch panel or switch. For example, the Ethernet connector 110 and/or the Ethernet connector 150 may be small enough to fit 48 and/or 96 connectors in a 1 RU patch panel.

The Ethernet connectors 110 and/or 150 may comprise positions for 12 conductor contacts for coupling with various types of twisted pair cable. For example, the Ethernet connector 150 may be coupled to the twisted pair cable 160. The Ethernet connectors 110 and/or 150 may be configured such that all 12 contact positions are populated with conductor contacts or only a portion of the 12 positions are populated with conductor contacts. In addition, the Ethernet connectors 110 and/or 150 may be configured for a variable number of grounding contacts.

The twisted pair cable 160 is not limited to any specific type of twisted pair cable and may comprise any suitable twisted pair cable. For example, the twisted pair cable 160 may comprise shielded or unshielded copper cable. Each twisted pair may be shielded and/or a sheath may shield all or a portion of the cable 160. The shielding and/or sheath may be grounded via contacts in the Ethernet connectors 110 and/or 150. Exemplary twisted pair cable 160 may comprise category 5 category 5e, category 6, category 6a, category 7 or different cabling that may comprise a greater number of conductors. However, the invention is not limited in this regard, for example, category 3—type 2 cables may be utilized as well.

The Ethernet connector 110 and/or the Ethernet connector 150 may be configurable to communicate data at various ranges of data rates. For example, various configurations of the Ethernet connectors 110 and 150 may be operable to support communication at one or more standard rates such as 10 Mbps, 100 Mbps, 1 Gbps, and 10 Gbps (10BASE-T, 100GBASE-TX, 1000BASE-T, and/or 10GBASE-T), at one or more potentially standardized rates such as 40 Gbps and 100 Gbps and/or at one or more non-standard rates such as 2.5 Gbps and 5 Gbps. Moreover, the Ethernet connector 110 and/or the Ethernet connector 150 may be operable to support standard Ethernet link lengths or ranges of operation and/or support extended ranges of operation.

The Ethernet connectors 110 and/or 150 may comprise suitable logic, circuitry, interfaces and/or code that may be operable to handle data communication that is based on one or more Ethernet standards, for example, IEEE 802.11 standards and variations thereof. In various embodiments of the invention, the Ethernet connectors 110 and/or 150 may be operable to support communication based on Ethernet over twisted pair standards 10BASE-T and 100BASE-TX which may utilize two pairs of UTP. In another embodiment of the invention, the Ethernet connectors 110 and/or 150 may be operable to support Ethernet over twisted pair standards 1000BASE-T and 10GBASE-T and may utilize four pairs of UTP or shielded cable, for example.

In operation, exemplary embodiments of the Ethernet connectors 110 and/or 150 that may be operable to communicate at higher data rates and/or may provide higher levels of performance for a given rate, may be referred to as higher end versions or higher end configurations. Exemplary embodiments of the Ethernet connectors 110 and/or 150 that may be operable to communicate only at lower data rates and/or may provide lower levels of performance for a given data rate, may be referred to as lower end versions or lower end configurations. For example, higher end versions of the Ethernet connectors 110 and/or 250, may comprise a greater number of conductor contacts and/or may be made with superior materials than lower end versions. A higher end version may comprise shielding and/or better grounding. In various embodiments of the invention, a higher end version may be configured with a latching mechanism while a lower end version may not latch. Higher end versions may be priced differently than lower end versions, for example, due to a difference in cost of materials and/or a difference in manufacturing requirements.

Although configurations of the Ethernet connectors 110 and/or 150 may vary, the various configurations may comprise the same or a similar general form factor. When a pair of corresponding Ethernet connectors 110 and 150 comprise the same or similar configurations, the Ethernet connectors may be operable to be coupled and may communicate at a data rate and/or at a level of performance that is determined based on their similar configurations. In instances when the coupled Ethernet connectors 110 and 150 may comprise different configurations, for example, when one connector may comprise a higher end configuration and the corresponding connector may comprise a lower end configuration, the Ethernet connectors may be operable to be coupled, however, they may only be operable to communicate at a data rate and/or at a level of performance that is supported by the lower end configuration. For example, the Ethernet connectors 110 and 150 may each have 12 positions for conductor contacts. The Ethernet connector 110 may have all twelve positions populated with contacts but the Ethernet connector 150 may only have eight positions populated for four pairs of conductors. The Ethernet connector 110 may be configured to terminate a shielded cable; however, the Ethernet connector 150 may be coupled to an unshielded twisted pair cable. The Ethernet connector 110 may be configured to support multiple streams of video data at an aggregate data rate of 40 Gbps over 100 meters while the Ethernet connector 150 may be configured to communicate at up to 1 Gbps over 100 meters. In such a configuration, the coupled pair of Ethernet connectors 110 and 150 may be operable to communicate only up to 1 Gbps over 100 meters, based on the configuration of the Ethernet connector 150. Thus, portions of the Ethernet connector 110 may not be utilized for communication.

In various embodiments of the invention, the connector 110 and/or the connector 150 may comprise a physical layer device (PHY). U.S. patent application Ser. No. 12/702,173, filed on Feb. 8, 2010, which is incorporated herein by reference in its entirety, may comprise additional information regarding a connector interface comprising an integrated PHY device.

In various embodiments of the invention, the connector 110 and/or the connector 150 may comprise suitable logic, circuitry, interfaces and/or code that may be operable to provide and/or utilize power over Ethernet (POE). U.S. patent application Ser. No. 12/752,065, filed on Mar. 31, 2010, which is incorporated herein by reference in its entirety, describes a connector and/or connection interface that may provide power over Ethernet functionality. Alternatively, in various embodiments of the invention, the Ethernet connector 110 and/or the Ethernet connector 150 may comprise a power source.

In various embodiments of the invention, the connector 110 and/or the connector 150 may comprise suitable logic, circuitry, interfaces and/or code that may be operable to communicate wirelessly. For example, the connector 110 and/or the connector 150 may comprise an antenna and/or a wireless access point. U.S. patent application Ser. No. 12/785,102, filed on May 21, 2010, which is incorporated herein by reference in its entirety, may comprise additional information regarding a connection interface comprising wireless and/or wire-line capability.

Figure 2:
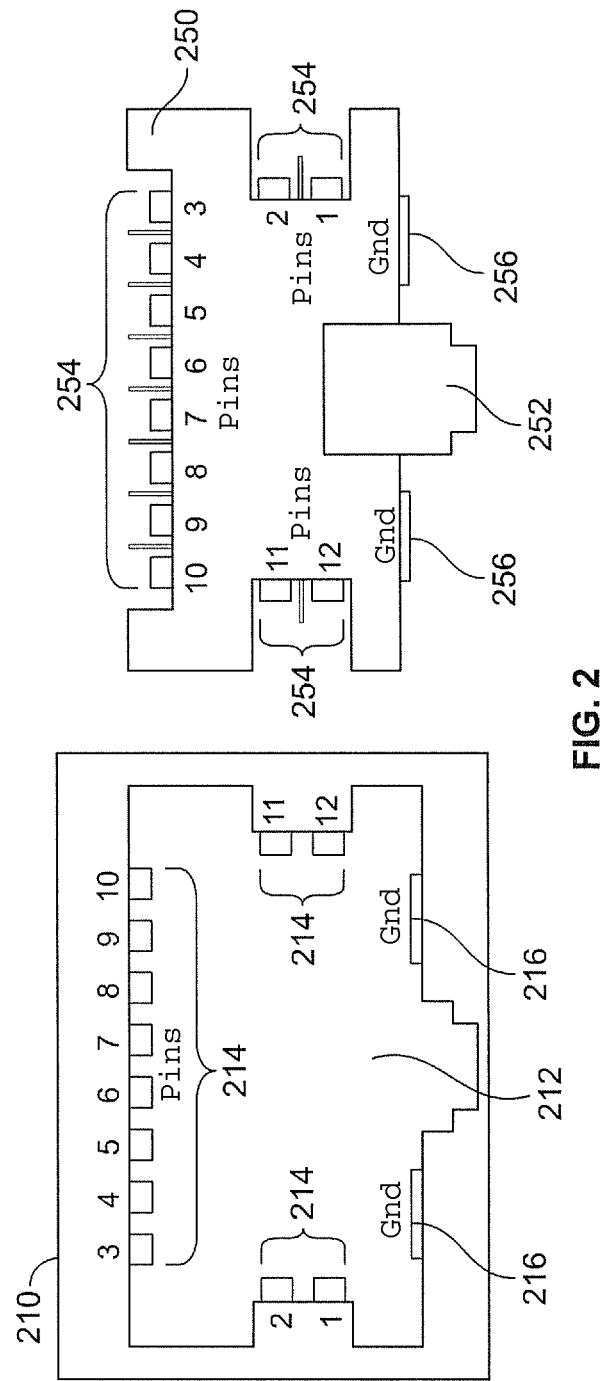
FIG. 2 is a block diagram illustrating exemplary contact positions in a pair of corresponding configurable Ethernet connectors, in accordance with an embodiment of the invention.

FIG. 2 is a block diagram illustrating exemplary contact positions in a pair of corresponding configurable Ethernet connectors, in accordance with an embodiment of the invention. Referring to FIG. 2, there is shown an Ethernet connector receptacle 210 which may comprise a keyed receptacle area 212, a plurality of contact positions 214 and a plurality of ground contacts 216. In addition, there is shown a corresponding Ethernet connector plug 250 which may comprise a key area 252, a plurality of contact positions 254 and a plurality of ground contacts 256.

The Ethernet connector receptacle 210 may be similar and/or substantially the same as the Ethernet connector 110, for example. The Ethernet connector 250 may be similar and/or substantially the same as the Ethernet connector 150, for example. The Ethernet connector receptacle 210 may be operable to be coupled to the Ethernet connector plug 250. The Ethernet connector receptacle 210 and the Ethernet connector plug 250 may be referred to as the Ethernet connectors 210 and 250 respectively. The Ethernet connectors 210 and 250 may be configurable and/or modular such that different configurations may enable communication at different data rates and/or different performance levels for a given rate.

The keyed receptacle area 212 of the Ethernet connector receptacle 210 may comprise a plurality of contact positions 214. The Ethernet connector receptacle 210 may be configurable such that all or a portion of the plurality of contact positions 214 may be populated with a conductor contact. In an exemplary embodiment of the invention, the Ethernet connector receptacle 210 may comprise twelve contact positions; however, the invention is not limited in this regard. The Ethernet connector receptacle may be configured differently for use in different types of communication. For example, only four contact positions may be populated for use in VOIP, or communication for general desktop applications. Twelve of the plurality of contact positions 214 may be populated, for example, for use in communicating multiple streams of 10 Gbps uncompressed video. The conductor contacts that are populated in the plurality of contact positions 214 may be made of various materials that may comprise different electrical characteristics and may enable various levels of performance. For example, copper, gold and/or silver may be utilized in the conductor contacts which may vary in conductivity and in skin effect losses. The keyed receptacle area 212 may also comprise a plurality of ground contacts 216 that may be coupled to a corresponding plurality of ground contacts 256 in the Ethernet connector plug 250. The configuration of the Ethernet receptacle connector 210 may be varied by populating and/or depopulating one or more of the plurality of ground contacts 216.

The Ethernet connector plug 250 may comprise a plurality of contact positions 254. The plurality of contact positions 254 may be distributed around the top sides and/or bottom of the Ethernet connector plug 250. In an exemplary embodiment of the invention, their may be twelve contact positions in the Ethernet connector plug 250 however, the invention is not limited in this regard. The Ethernet connector plug 250 may be configurable such that all or a portion of the plurality of contact positions 254 may be populated with a conductor contact. Similar to the Ethernet connector receptacle 210, the Ethernet connector plug 250 may be configured differently for use in different types of communication. Also, the conductor contacts that may be populated in the plurality of contact positions 254, may be made of various materials, such as, for example, copper, gold and/or silver. The Ethernet connector plug 250 may also comprise a plurality of ground contacts 256 that may be coupled to the corresponding plurality of ground contacts 216 in the Ethernet connector receptacle 210. The configuration of the Ethernet connector plug 250 may be varied by populating and/or depopulating one or more of the plurality of ground contacts 256.

In operation, the Ethernet connector plug 250 may comprise the key area 252 that may enable aligned coupling to the keyed receptacle area 212. Although square corners are shown in the shapes of the key area 252 and the keyed receptacle area 212, the invention is not limited in this regard and any suitably shaped key area, keyed receptacle area and/or corresponding plug and receptacle shapes may be utilized for keying the Ethernet connectors 210 and 250. For example, an overall shape of one or both of the Ethernet connectors 210 and 250 may prevent the connectors from being coupled incorrectly. In this regard, the overall shapes of the Ethernet connectors 210 and 250 may comprise complimentary exterior contours that may enable mating of the connectors in a proper orientation such that the connectors are not misaligned and/or damaged.

In various embodiments of the invention, the Ethernet connector plug 250 may be coupled to a twisted pair cable such as the twisted pair cable 160 described with respect to FIG. 1. The conductor contacts that may be populated in the plurality of contact positions 254 may be coupled to conductors in the coupled twisted pair cable. In this regard, conductors of a differential pair in the twisted pair cable may be terminated in adjacent positions of the plurality of contact positions 254.

In various exemplary embodiments of the invention, a physical layer device that may communicate via the Ethernet connector plug 250, may adjust data rates and/or communication distance based on the number of pairs that may be populated in the Ethernet plug 250. For example, the Ethernet connector plug 250 may be populated with a variable number of conductors, such as, for example, 2, 4, 6 or 8 conductors, and may be coupled to a PHY device. The PHY device may determine how many conductors are populated in the coupled connector and may determine data rates and/or distances that the coupled connector and/or cable are operable to support. A greater number of populated conductors may enable greater data rates and/or extended communication distances.

The keyed receptacle area 212 may comprise a plurality of ground contacts 216 that may be coupled to a corresponding plurality of ground contacts 256 in the Ethernet connector plug 250. In instances when the twisted pair cable coupled to the Ethernet connector plug 250 is shielded, the plurality of ground contacts 256 and the plurality of ground contacts 256 may be utilized to ground the shielding. For example, each pair of conductors in a twisted pair cable may be shielded and/or all of the twisted pairs in a cable may be shielded. The Ethernet connector receptacle 210 may be coupled to a circuit board or to a patch panel, for example, and thus, the plurality of ground contacts 216 may be coupled to the circuit board or to the patch panel. In this manner, cable shielding coupled to the Ethernet connector plug 250 may be grounded via the Ethernet connector receptacle 210. The number of ground contacts populated in the Ethernet connector receptacle 210 and/or in the Ethernet connector plug 250 may be varied such that a variable number of cabling shields may be grounded depending on the connector configurations.

Figure 3:
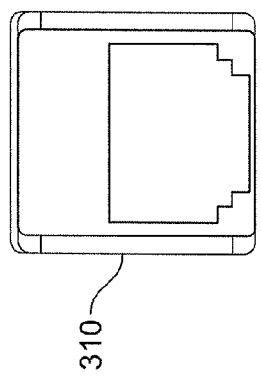
FIG. 3 is a block diagram illustrating an exemplary Ethernet connector module, in accordance with an embodiment of the invention.

FIG. 3 is a block diagram illustrating an exemplary Ethernet connector module, in accordance with an embodiment of the invention. Referring to FIG. 3, there is shown an Ethernet connector module 310.

The Ethernet connector module 310 may be similar or substantially the same as the Ethernet connector 110 and/or the Ethernet connector receptacle 210, for example. The Ethernet connector module 310 may be configurable. For example, the Ethernet connector module 310 may comprise a variable number of conductor contacts and a variable number of ground contacts which may be made of various materials. Furthermore, the Ethernet connector module 310 may or may not be shielded and may optionally be configured to comprise a latching mechanism which may, for example, be internal to the connector module.

The Ethernet connector module 310 may be operable to couple to a corresponding Ethernet connector plug 250, for example, and may provide a protective housing for conductor contacts. The connector module 310 may comprise a form factor that may enable neat, compact stacking or ganging of like connector modules, for example, for installation in a patch panel or a switch or for ganging of a plurality of Ethernet connector modules. The Ethernet connector module 310 may comprise dimensions that are smaller than an RJ45 connector and that may be small enough to fit into a handheld device or to fit greater than 24 modules in a 1 rack unit face plate, for example.

In operation, a single Ethernet connector module 310 or a plurality of like connectors may be installed on a circuit board, in a patch panel and/or a wall mount, for example. For example, a plurality of Ethernet connector modules 310 may be installed neatly and compactly into a communication device such as a switch in such a way as to provide improved connector density over RJ45 connectors. Also, a plurality of like connectors such as the Ethernet connector module 310 may be ganged in a single module or unit that may be installed in various communication devices, patch panels and/or wall mounts, for example. Sufficient and/or uniform spacing between stacked or ganged Ethernet connector modules 310, may allow for ease of connecting and/or disconnecting corresponding Ethernet plugs such as the Ethernet connector plug 250.

Figure 4:
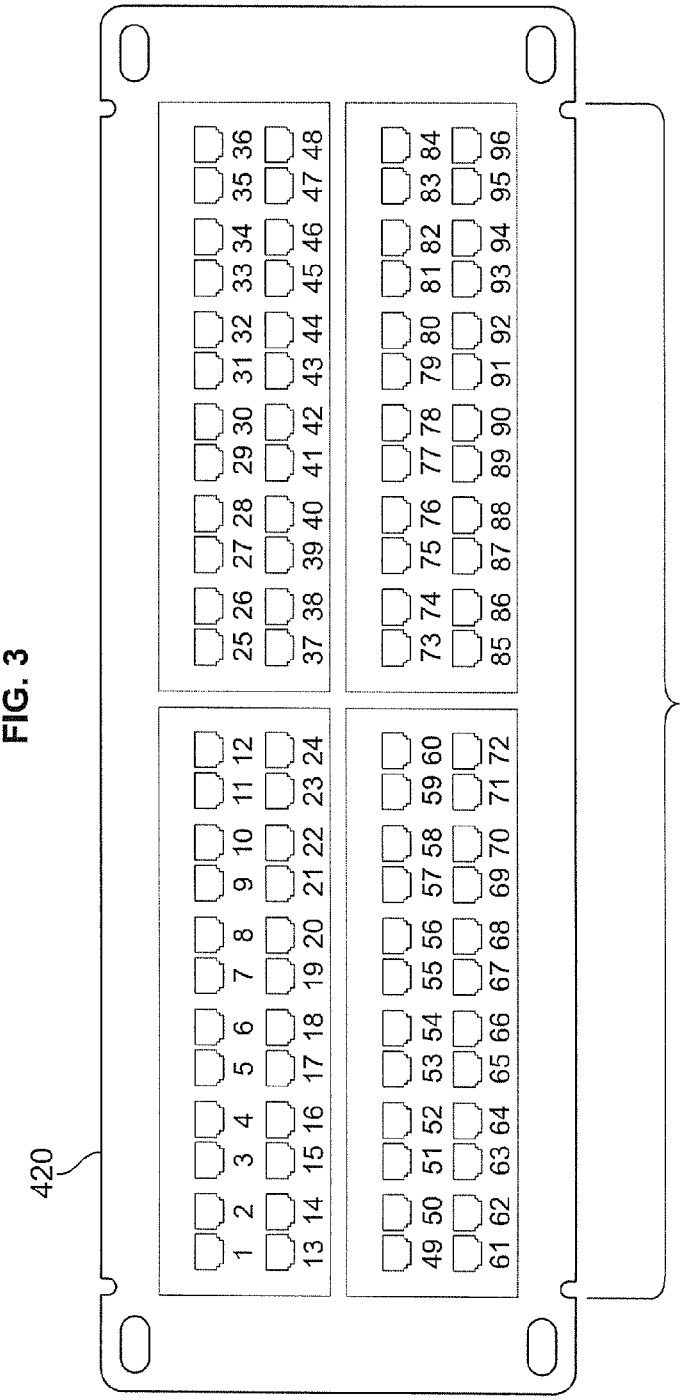
FIG. 4 is a block diagram illustrating exemplary ganged and stacked Ethernet connector modules, in accordance with an embodiment of the invention.
Figure 5:
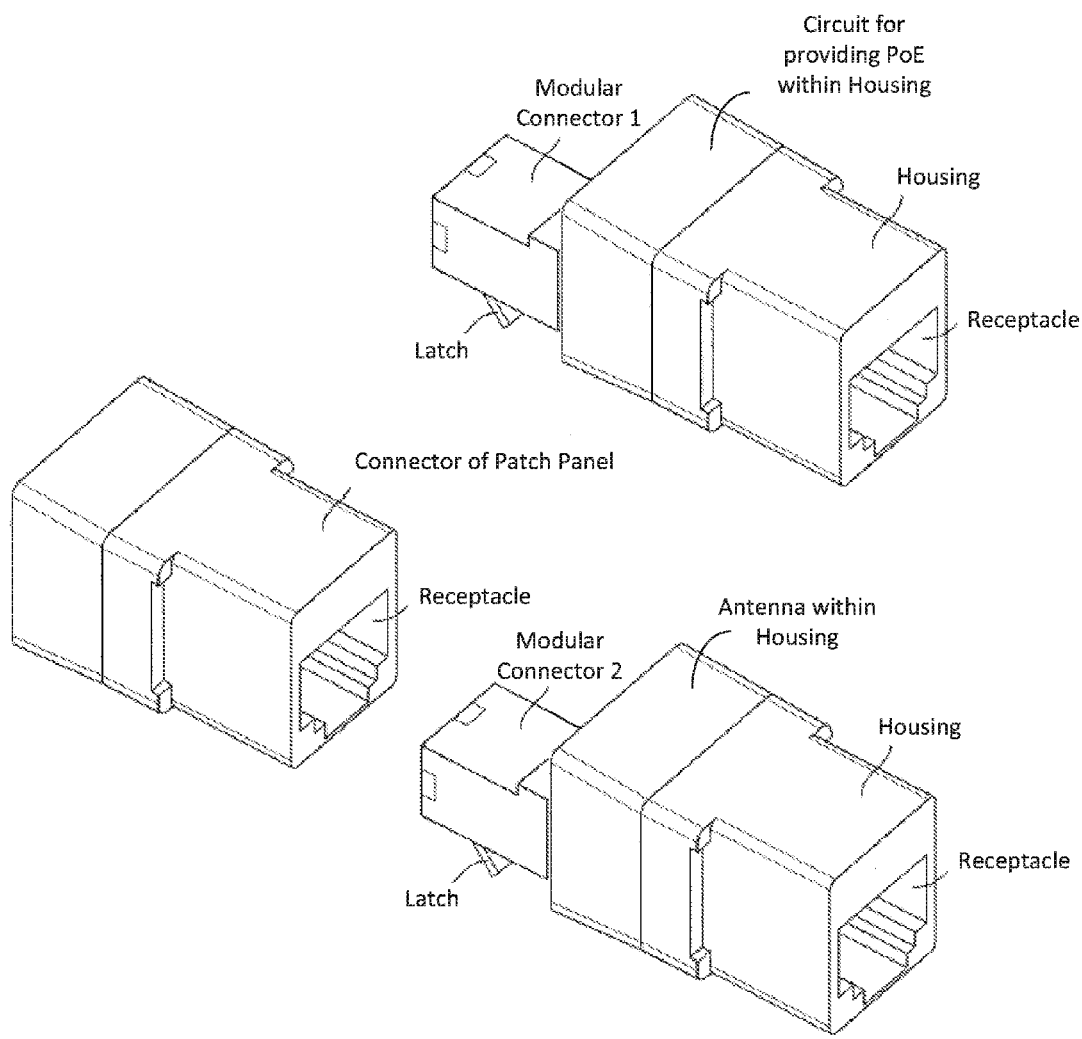
FIG. 5 is a block diagram illustrating exemplary modular connectors and a connector of a patch panel, in accordance with an embodiment of the invention.

FIG. 4 is a block diagram illustrating exemplary ganged and stacked Ethernet connector modules, in accordance with an embodiment of the invention. Referring to FIG. 4, there is shown an exemplary patch panel 420 that may comprise a plurality of Ethernet connector modules 410.

The exemplary patch panel 420 may comprise a plurality of Ethernet connector modules 410 which may be similar and/or substantially the same as the Ethernet connector module 310, the Ethernet connector 110 and/or the Ethernet connector receptacle 210, for example. The exemplary patch panel 420 may comprise a vertical dimension of 1 rack unit (RU) and a horizontal dimension of 19 inches, for example. Although ninety-six Ethernet connector modules are shown, the number of Ethernet connector modules 410 that may be installed in the exemplary patch panel 420 is not limited to any specific number. For example, the 1 RU patch panel 420 may comprise greater than twenty-four modules, for example, forty eight modules or ninety-six modules. In various embodiments of the invention, a portion, for example, twelve or twenty-four of the plurality of Ethernet connector modules 410 may be ganged into a single unit. Four such ganged units are shown in the exemplary patch panel 420, however, the invention is not limited in this regard and any suitable number of Ethernet connector modules 310 may be ganged together.

In operation, the exemplary patch panel 420 may comprise the plurality of Ethernet connector modules 410 which may comprise ninety-six modules, for example. The exemplary patch panel 420 may be utilized in an enterprise or residential environment, for example. The exemplary patch panel 420 may provide connectivity between one or more local communication devices such as a switch and/or a server and one or more remote devices such as a computer or a television, for example, which may be located in the same room or in another room or office.

The plurality of Ethernet connector modules 410 may comprise connectors with a variety of configurations. For example, all of the plurality of Ethernet connector modules 410 may be configured to communicate data at uniform data rates or portions of the connector modules may be configured to communicate data at one or more different rates and/or at different performance levels. In an exemplary embodiment of the invention, a portion of the plurality of Ethernet connector modules 410 may be configured to communicate data at 10 Mbps, 100 Mbps and/or 1 Gbps. Another portion of the plurality of Ethernet connector modules 410 may be configured to communicate at 10 Gbps or 40 Gbps, for example. Various Ethernet standards may be utilized for communicating data via the exemplary patch panel 420 and the plurality of Ethernet connector modules 410. In this regard, different configurations of Ethernet connector modules or ganged connectors that may be installed in the exemplary patch panel 420 may be priced differently.

In an embodiment of the invention, an Ethernet connector 210, for example, may be operable to communicate data in accordance with Ethernet standards and to communicate data to a corresponding Ethernet connector 250, for example, which is coupled to the Ethernet connector 210. The Ethernet connector 210 and/or the corresponding Ethernet connector 250 may be modular and/or may be configurable. The Ethernet connector 210 and/or the corresponding Ethernet connector 250 may comprise at least twelve contact positions 214 and 254 respectively, for example. The Ethernet connector 210 and/or the corresponding Ethernet connector 250 may be configurable to communicate data at various data rates that may comprise rates less than 10 Gbps and data rates of at least 10 Gbps.

The Ethernet connector 210 and/or the corresponding Ethernet connector 250 may be, one or both of, sized to fit within a handheld device and sized to fit greater than twenty-four modules of the Ethernet connector and/or of the corresponding Ethernet connector, in a 1 rack unit, 19 inch panel, for example, the exemplary patch panel 420. The twelve contact positions 214 and/or 254 may be configurable to have a variable number of populated conductor contacts, a variable number of unpopulated contact positions and/or a variable number of ground contacts 256, for example. One or both of the Ethernet connector 210 and the corresponding Ethernet connector 250 may be shielded and/or may be configurable to ground shielding of an attached cable, for example, the twisted pair cable 160. The Ethernet connector 210 and/or the corresponding Ethernet connector 250 may be configurable such that one or more of the contact positions 214 and/or 254, may be populated with various types of conducting materials. One or both of the Ethernet connector 210 and the corresponding Ethernet connector 250 may be configured with a latching mechanism to mechanically secure coupling of the Ethernet connectors.

One or both of the Ethernet connector 210 and the corresponding Ethernet connector 250 may be sized and fitted together such that friction between the Ethernet connector 210 and the corresponding Ethernet connector 250 may be utilized to mechanically secure coupling of the Ethernet connectors. One or both of the Ethernet connector 210 and the corresponding Ethernet connector 250 may be keyed to protect from incorrectly coupling the Ethernet connectors. The Ethernet connector 210 and the corresponding Ethernet connector 250 may be operable to be coupled together and to function without damaging the Ethernet connectors when the Ethernet connectors are configured differently. Conductors of a differential pair of conductors may be terminated in adjacent contact positions 214 and/or 254 in the Ethernet connector 210 and/or in the corresponding Ethernet connector 250 respectively. The Ethernet connector 210 and/or the corresponding Ethernet connector 250 may be configurable to be ganged and/or stacked with similar Ethernet connectors. The Ethernet connector 210 and/or the corresponding Ethernet connector 250 may comprise one or more of power over Ethernet technology, a physical layer device and a wireless communication antenna. In this manner, a modularized configurable connector system for Ethernet applications may be configurable to communicate at lower rates such as 10 Mbps and may be configurable to communicate at higher rates such as 40 Gbps.

In another embodiment of the invention, a first modular Ethernet connector 210 and/or a corresponding second modular Ethernet connector 250, for example, may be operable to communicate data in accordance with Ethernet standards. The first modular Ethernet connector 210 may communicate data with the corresponding second modular Ethernet connector 250 that is communicatively coupled to the first modular Ethernet connector 210. The first modular Ethernet connector 210 and/or the corresponding second modular Ethernet connector 250 may be configurable into one or more of a plurality of configurations to enable communication of data at data rates that are less than, equal to and/or greater than 10 Gigabits per second. The first modular Ethernet connector 210 and/or the corresponding second modular Ethernet connector 250 may comprise at least 12 electrical conductor contact positions 214, 254, 216 and/or 256, for example. The first modular Ethernet connector 210 and the corresponding second modular Ethernet connector 250 may be sized to fit within a handheld device. The first modular Ethernet connector 210 and the corresponding second modular Ethernet connector 250 may be sized so as to fit 24 or more of the first modular Ethernet connector 210 and/or 24 or more of the corresponding second modular Ethernet connector 250 in a single standard size 1 rack unit faceplate of a 19 inch rack, for example, the exemplary patch panel 420. The first modular Ethernet connector 210 and the corresponding second modular Ethernet connector 250 may be configurable to have a variable number of populated electrical conductor contacts, for example, in the plurality of contact positions 214 and/or 254; a variable number of unpopulated electrical conductor contact positions, for example, in the a plurality of contact positions 214 and/or 254; and/or a variable number of electrical ground conductor contacts, for example, in the plurality of ground contacts 216 and/or 256. One or both of the first modular Ethernet connector 210 and the corresponding second modular Ethernet connector 250 are, one or both of shielded and configurable to ground shielding. The first modular Ethernet connector 210 and the corresponding second modular Ethernet connector 250 may be configurable to populate one or more of the electrical conductor contact positions 214, 216, 254 and/or 256 with various types of conducting materials. The first modular Ethernet connector 210 and/or the corresponding second modular Ethernet connector 250 may be configured with a latching mechanism, for example, such as the latching mechanism 152 to mechanically secure proper coupling of the first modular Ethernet connector 210 to the corresponding second modular Ethernet connector 250. The first modular Ethernet connector 210 and/or the corresponding second modular Ethernet connector 250 may be sized and fitted together such that friction between the first modular Ethernet connector and the corresponding second modular Ethernet connector is utilized to mechanically secure coupling of the first modular Ethernet connector 210 and the corresponding second modular Ethernet connector 250. The first modular Ethernet connector 210 and/or the corresponding second modular Ethernet connector 250 may be coupled to a twisted pair cable, for example, the twisted pair cable 160. Conductors of a differential pair of conductors may be terminated in adjacent electrical conductor contact positions, for example, in the electrical conductor contact positions 214, 216, 256 and/or 254, in the first modular Ethernet connector 210 and the corresponding second modular Ethernet connector 250. The first modular Ethernet connector 210 and/or the corresponding second modular Ethernet connector 250 may comprise one or more integrated physical layer devices. The first modular Ethernet connector 210 and/or the corresponding second modular Ethernet connector 250 may comprise one or more integrated wireless communication antennas. The first modular Ethernet connector 210 and/or the second corresponding modular Ethernet connector 250 may be configured to enable communication of power utilizing Power Over Ethernet (POE).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a modularized configurable connector system for Ethernet applications.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a first connector configured to directly connect with a second connector and a patch panel, the first connector comprising:
an antenna;
a first circuit that is operable to communicate data in accordance with Ethernet standards; and
a housing with a latching mechanism operable to:
mechanically secure the first connector to the second connector, the second connector including a similar housing with a corresponding latching mechanism and a second circuit that is operable to provide Power Over Ethernet (POE) and to communicate data in accordance with Ethernet standards; and
electrically couple the first circuit and the second circuit, wherein the first and the second connectors include dimensions similar to or smaller than an RJ45 connector, wherein the first and the second connectors are manually and directly attachable to an external receptacle of a patch panel.

2. The system of claim 1, wherein the first and the second connectors are secured to or housed in a mobile device.

3. The system of claim 1, wherein the first and the second connectors are secured to or housed in a rack mounted computing device.

4. The system of claim 1, wherein the first and the second connectors are configurable to include populated electrical conductor contacts, unpopulated electrical conductor contacts, and electrical ground conductor contacts.

5. The system of claim 1, wherein the first and the second connectors further comprise ground shielding.

6. The system of claim 1, wherein the first and the second circuits are further operable to communicate data at data ranges equal or greater than 10 Gigabits per second.

7. The system of claim 1, wherein the first and the second connectors further comprise at least twelve electrical conductor contact positions, respectively.

8. A connector system comprising:
a first connector and a second connector, wherein the first and the second connectors include dimensions similar to or smaller than an RJ45 connector, wherein the first and the second connectors are manually and directly attachable to each other and a receptacle of a patch panel, and wherein the first connector and the second connector are functionally and structurally independent of each other;
the first connector comprising a first circuit operable to:
communicate data in accordance with Ethernet standards; and
provide power in accordance with Power Over Ethernet (POE) standards;
the second connector comprising a second circuit that comprises an antenna;
the second circuit operable to:
communicate data in accordance with Ethernet standards; and
communicate wirelessly via the antenna;
the first and the second connectors each comprising a similar respective housing with a latching mechanism operable to:
electrically couple the first circuit and the second circuit; and
mechanically secure the first connector to the second connector.

9. The connector system of claim 8, wherein the first and the second connectors are secured to or housed in a mobile device.

10. The connector system of claim 8, wherein the first and the second connectors are secured to or housed in a rack mounted computing device.

11. The connector system of claim 8, wherein the first and the second connectors are configurable to include populated electrical conductor contacts, unpopulated electrical conductor contacts, and electrical ground conductor contacts.

12. The connector system of claim 8, wherein the first and the second connectors further comprise ground shielding, respectively.

13. The connector system of claim 8, wherein the first and the second circuits are further operable to communicate data at data ranges equal or greater than 10 Gigabits per second.

14. The connector system of claim 8, wherein the first and the second connectors further comprise at least twelve electrical conductor contact positions, respectively.

15. A first connector, comprising:
a first circuit that is configured to:
provide Power Over Ethernet (POE); and
communicate data in accordance with Ethernet standards; and
a housing with a latching mechanism operable to:
mechanically secure the first connector to a second connector, the second connector including a similar housing with a corresponding latching mechanism, an antenna, and a second circuit operable to communicate data in accordance with Ethernet standards; and
electrically couple the first circuit and the second circuit, wherein the first and the second connectors include dimensions similar to or smaller than an RJ45 connector, wherein the first and the second connectors are manually and directly attachable to an external receptacle of a patch panel and each other.

16. The first connector of claim 15, wherein the housing is further configured to receive an RJ45 connector.

17. The first connector of claim 15, wherein the housing is further configured to receive an Ethernet connector.

18. The first connector of claim 15, wherein the housing includes a male part to be received by a female part of an Ethernet connector receptacle, and wherein the male part includes a latch configured to lock the male part to the female part.

19. The first connector of claim 15, wherein the housing includes a female part to receive a male part of an Ethernet connector and latch onto the male part.

20. The first connector of claim 15, wherein the first and the second circuits are further operable to communicate data at data ranges equal or greater than 10 Gigabits per second.

* * * * *